UNITED STATES PATENT OFFICE.

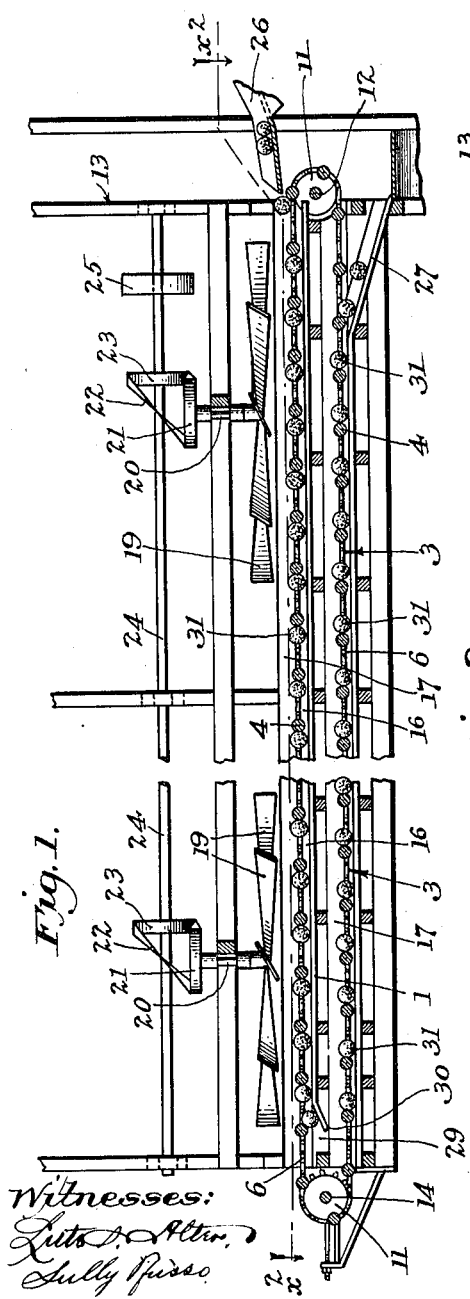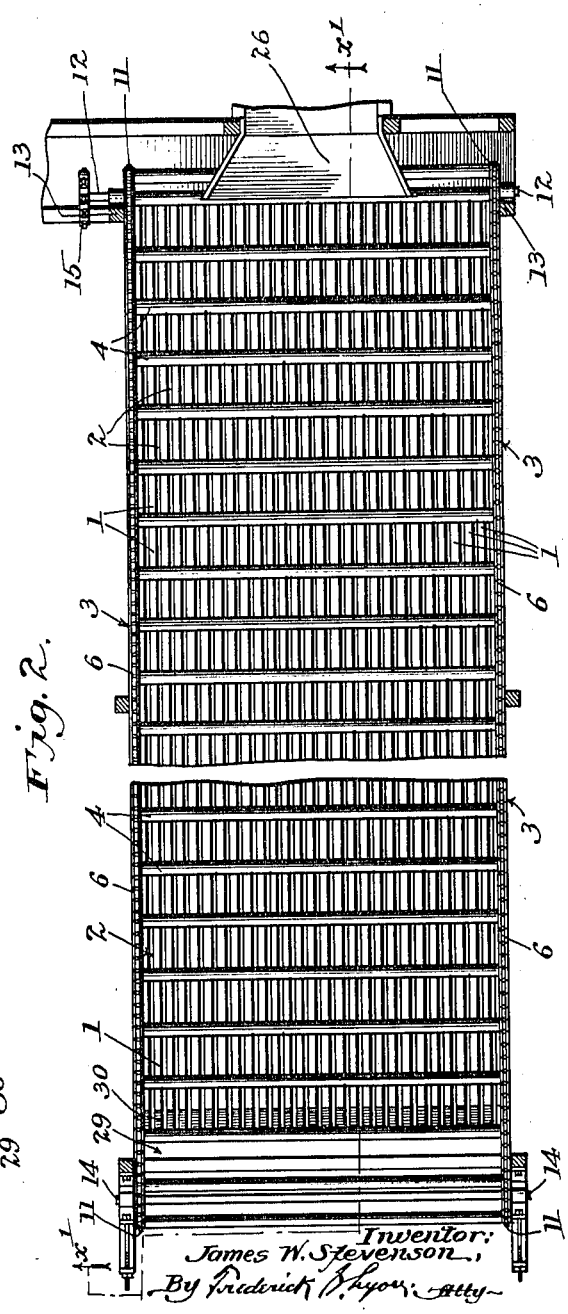

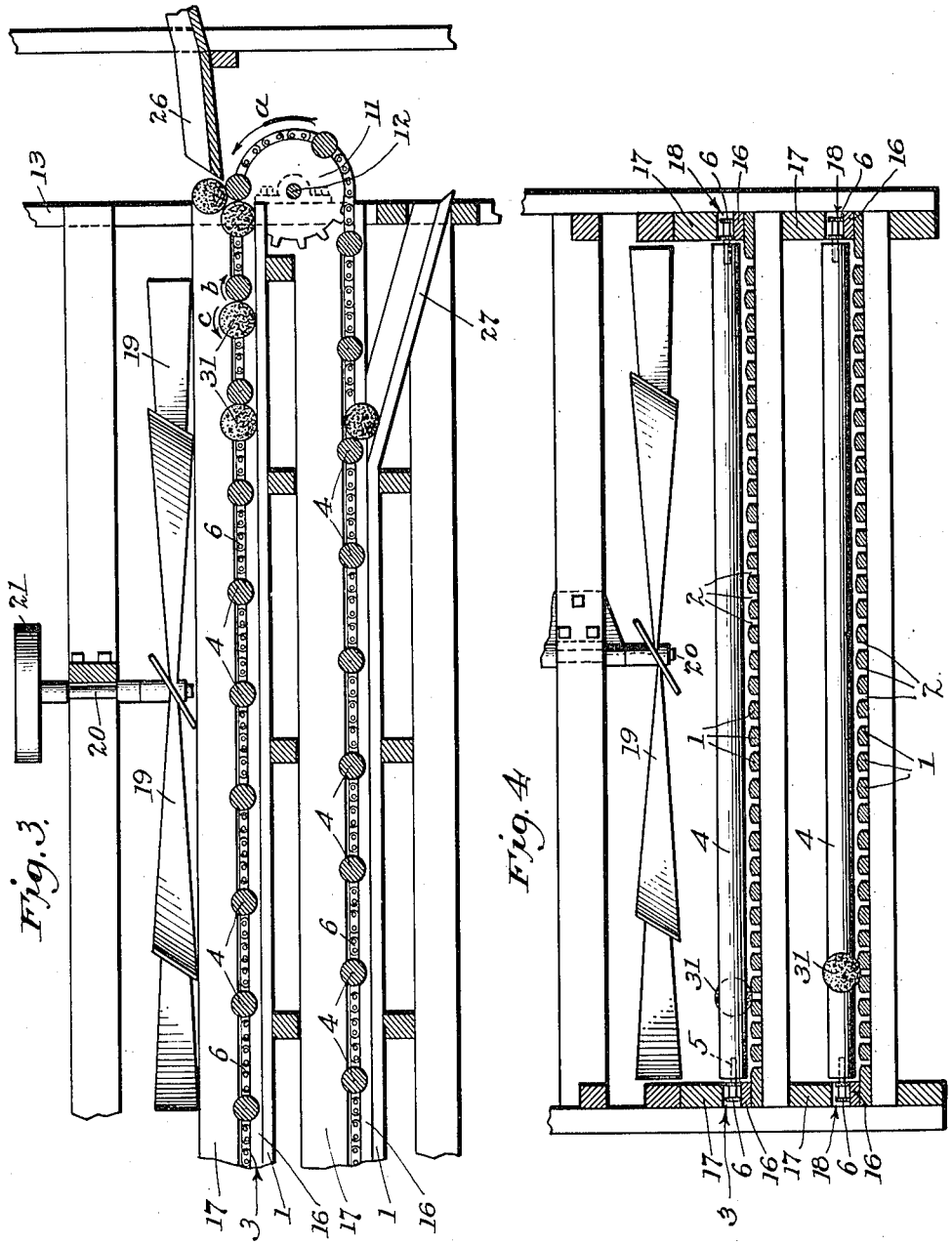

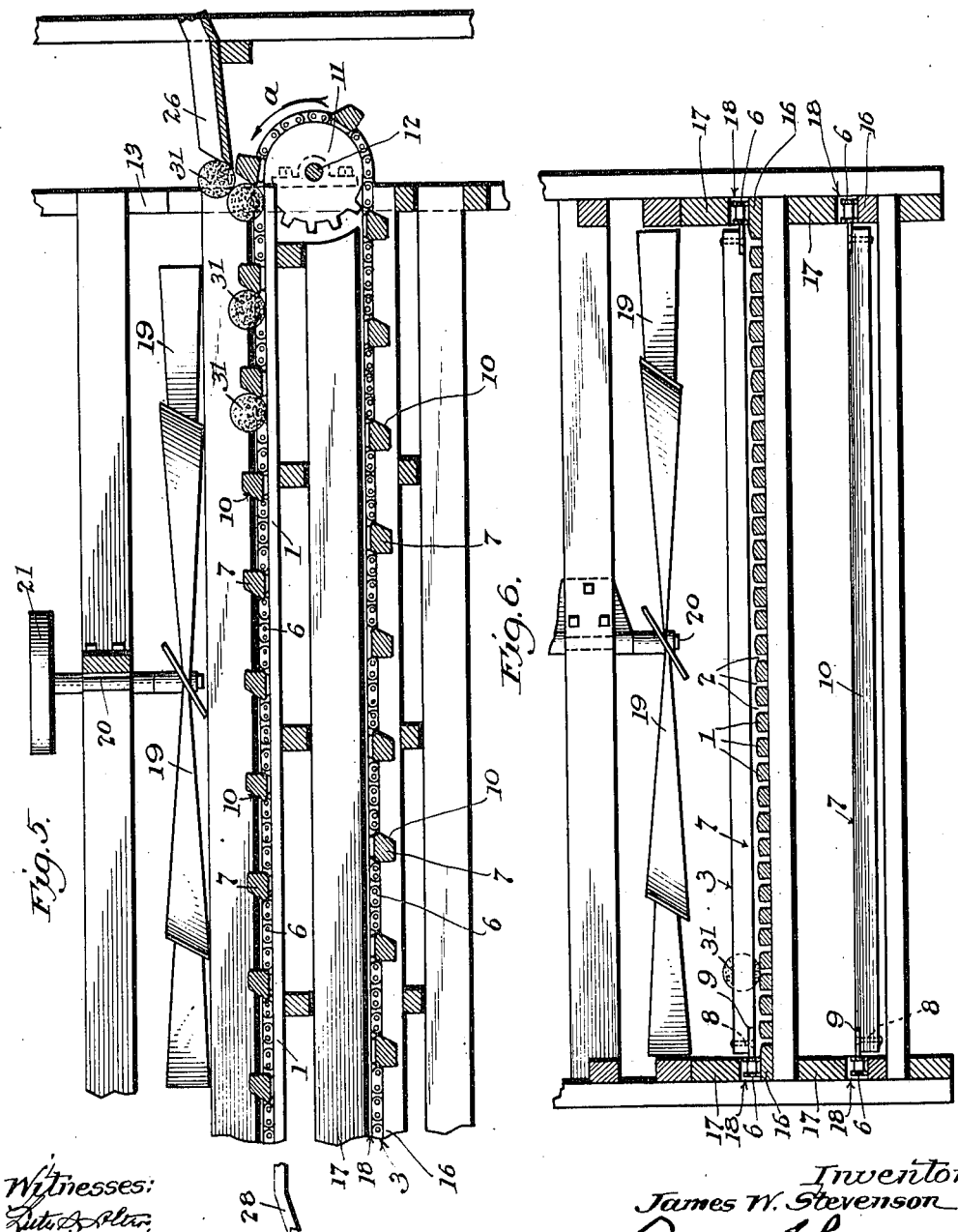

JAMES W. STEVENSON, OF RIVERSIDE, CALIFORNIA.

FRUIT CONVEYER AND DRIER.

1,292,128.     Specification of Letters Patent.     Patented Jan. 21, 1919.

Application filed April 25, 1918. Serial No. 230,622.

*To all whom it may concern:*

Be it known that I, JAMES W. STEVENSON, a citizen of the United States, residing at Riverside, in the county of Riverside and State of California, have invented a new and useful Fruit Conveyer and Drier, of which the following is a specification.

This invention relates to means for conveying and drying fruit. A serious difficulty in the conveying, elevating and drying of fruit is the liability of the fruit being bruised or otherwise injured by excessive friction, jolting or jarring; the injured fruit, as is well known, being liable to rapid decay and also affecting uninjured fruit in contact therewith. Fruit of the citrus variety, particularly oranges and lemons, have skins or peels which contain a great number of easily ruptured oil cells and excessive friction will rupture the oil cells. Rupturing of the oil cells rapidly induces decay of the fruit.

An object of this invention is to make provision for conveying and drying the fruit with minimum liability of injuring the fruit skins.

The invention relates in some particulars to means for drying the fruit while it is being conveyed.

Another object is to provide fruit handling apparatus of simple construction, entirely automatic in operation, and comparatively inexpensive to manufacture and operate.

This is in part a continuation of my copending application for patent for fruit conveyer filed August 21, 1917, Serial No. 187,477, the form shown in Figs. 1 to 4 being divided out of said application.

The accompanying drawings illustrate the invention:

Figure 1 is a longitudinal sectional elevation taken on line $x^1$—$x^1$, Fig. 2.

Fig. 2 is a plan section on line indicated by $x^2$—$x^2$, Fig. 1.

Fig. 3 is an enlarged fragmental longitudinal sectional elevation of the right-hand portion of Fig. 1.

Fig. 4 is a cross-sectional elevation of the apparatus shown in Fig. 3.

Fig. 5 is a sectional elevation analogous to Fig. 3 showing a modified form of the conveyer impellers.

Fig. 6 is a cross section of Fig. 5.

A suitable supporting surface for the fruit is provided and this supporting surface is of a nature that will allow air to pass therethrough. In the instance shown, the supporting surface is formed by a series of longitudinally extending parallel slats 1 slightly spaced from one another so as to form openings 2 in the form of longitudinal slots. In the form shown in Figs. 1 to 4 some of the slats 1 are arranged in an upper series and some in a lower series, and in Figs. 5 and 6 the slats are arranged in one series only.

Immediately over the slats 1 and extending transversely thereto are the impelling members or flights of an endless conveyer indicated in general by the character 3. In Figs. 1 to 4 the impellers are in the form of rollers 4 rotatatively mounted at their ends on studs 5 projecting from the conveyer-chains 6. In Figs. 5 and 6 the impellers or flights are in the form of non-rotative bars 7 fastened by rivets 8 or equivalents to lugs or ears 9 projecting inward from the conveyer-chains 6. The bars 7 have their front faces, that is the faces turned in the direction of the movement of the conveyer as indicated by the arrow $a$, Fig. 5, beveled rearward away from the slats 1 so as to avoid pinching the fruit between the bars 7 and slats 1 when the conveyer is in operation. Another advantage of the beveled faces 10 of the flights 7 is that the contact of the flights with the fruit will occur at a level below the level of the axis about which the fruit turns as it is impelled along the slats so that the tendency of the flights is to lift the fruit rather than force it downward against the slats.

The conveyer-chains 6 are endless and are rove around sprocket wheels 11, one pair of sprocket wheels being mounted on a shaft 12 at one end of a suitable frame 13, and another pair of sprocket wheels being mounted on a shaft 14 located at the opposite end of said frame. The shaft 12 may be provided with means to operate it and in the instance shown is provided with a sprocket wheel 15 adapted to be connected by a sprocket-chain, not shown, with a suitable source of power. The flights 4 and 7 are spaced but slightly from the slats 1 and the spacing is maintained uniform from end to end of the slats as the flights are moved therealong by reason of the conveyer-chains 6 running on suitable rails 16 located at the sides of the frame 13, there being longitudinally extending members 17 spaced from the rails 16 directly over the chains 6 to prevent jumping upward of said chains. The spaces between the rails 16 and members 17 thus form chainways 18.

Mounted at suitable intervals along the frame 13 immediately over the upper run of the conveyer, are horizontally disposed fan-blades 19. These fan-blades 19 when in motion force large volumes of air downward through the conveyer and between the adjacent slats 1 so as to evaporate the water from the fruit being impelled by the conveyer and so as to thoroughly dry the fruit by the evaporative effect of the moving column of air. This particular type of fan construction is of advantage in the particular relation shown and described, since I am thereby enabled to obtain maximum drying effect with a minimum expenditure of power over fan or blower constructions heretofore employed for the purpose. The fan-blades 19 are mounted on vertical shafts 20 which are provided with pulleys 21 driven by belts 22 from other pulleys 23 mounted on a longitudinally extending shaft 24 journaled in the frame 13. The shaft 24 may be driven by suitable means and in the instance shown said shaft is provided with a pulley 25 adapted to be driven by a belt, not shown, from any suitable source of power. A feed-chute 26 is provided at one end of the frame and in Figs. 1 to 3 a discharge chute 27 is provided adjacent the lower run of the conveyer at the same end of the frame as the chute 26 is located. In Fig. 5 a discharge chute 28 is indicated at the opposite end of the frame from the chute 26 and adjacent the upper run of the conveyer. In the form of the invention shown in Figs. 1 to 4, the upper fruit supporting surface is provided at the end opposite the feed chute 26 with an opening 29 so as to allow the discharge of fruit from the upper series of slats to the lower series, and, if desired, an inclined chute 30 may be provided at the opening 29 so that the fruit will roll downward to adjacent the lower run of the conveyer in order to diminish the distance that the fruit will drop to avoid bruising it.

In practical operation, power will be applied to the pulley 25 to rotate the fan-blades 19 and power will also be applied to the sprocket-wheel 15 to impel the flights of the conveyer along the slats. The fruit after being washed in any suitable washer is discharged onto the chute 26 and from the chute 26 to the conveyer, said fruit, indicated at 31, rolling from the chute 26 to the slats 1 between each two adjacent flights. The flights in their movement along the slats 1 roll the fruit therealong so that it is constantly turning into different positions, thus exposing the fruit to the blast of air caused by the rotating fan-blades 19.

The current of air created by the revolving fan-blades 19 finds ready passage downward around the fruit and thence through the interslat spaces 2 so as to maximize the evaporative or drying effect of the air on the fruit, and when the fruit discharges from the chute 27 or 28, as the case may be, it will be perfectly dry and in condition for passing through a grader or packing directly into packing cases. Ordinarily the fruit is passed to a grader from the drier and, in fact, may be discharged directly into said grader if so desired.

It is readily seen that the flights 7 produce but a slight amount of friction on the fruit as it rotates. The flights 4, being rollers, are caused to rotate by the rotating fruit, thus substantially eliminating all friction on the fruit skins and avoiding rupturing of the oil cells. Flights in the form of rollers in this particular relation are new and produce different results than heretofore produced in roller conveyers, since the rollers are rotated by the fruit as it is impelled by the rollers.

Arrows b, c, Fig. 3, indicate the direction of rotation of the rollers and fruit.

The slats 1 may have their upper faces of convex shape so as to form channels to guide the fruit bodies from end to end of the drier. Thus if the fruit is properly distributed when discharged into the drier it will continue so and not tend to congest in any particular portion of the drier.

I claim:

1. In a fruit conveyer and drier, a fruit-supporting surface provided with openings, flights slightly spaced from the fruit-supporting surface, means to move the flights along the fruit-supporting surface, and means to blow air on the fruit as it rolls along the fruit-supporting surface.

2. In a fruit conveyer and drier, a fruit-supporting surface provided with openings, impeller bars slightly spaced from the fruit-supporting surface and having their front faces beveled rearward away from the fruit-supporting surface, means to move the bars along the fruit-supporting surface, and means to blow air on the fruit as it rolls along the fruit-supporting surface.

3. In a fruit conveyer and drier, a series of spaced slats to support fruit, flights slightly spaced from the slats, means to move the flights along the slats to roll the fruit, and means to blow air on the fruit as it rolls along the slats.

4. In a fruit conveyer and drier, a series of spaced slats to support fruit, impeller bars extending transversely of the slats and slightly spaced therefrom and having their front faces beveled rearward away from the slats, means to move the bars along the slats, and means to blow air on the fruit as it rolls along the slats.

5. In a fruit conveyer and drier, a fruit-supporting surface having openings therethrough, means to impel fruit along said fruit-supporting surface, horizontally disposed fan-blades immediately over the fruit-impelling means, and means to operate the fan-blades to blow air downwardly on the fruit while it is being impelled.

6. In a fruit conveyer and drier, a fruit-supporting surface having openings therethrough, vertical shafts supported at intervals above the fruit-supporting surface, horizontally extending fan-blades on the lower ends of said shafts, means to turn the shafts, and means immediately beneath the fan-blades to impel fruit along the fruit-supporting surface.

7. In a fruit conveyer and drier, a series of spaced slats to support fruit, flights slightly spaced from the upper surface of the slats, means to move the flights along the slats, horizontally disposed fan-blades immediately over the flights, and means to operate the fan-blades to blow air downwardly through the interslat spaces.

8. In a fruit conveyer and drier, a series of spaced slats having their upper faces convex to form channels, impeller flights spaced slightly from the upper faces of said slats, means to move the flights along the slats, and means to blow air on the fruit as it is rolled along the channels.

Signed at Riverside, California, this 19th day of April, 1918.

JAMES W. STEVENSON.

Witnesses:
C. H. DAUM,
H. E. UMHEY.